(12) United States Patent
Kanbara et al.

(10) Patent No.: US 10,868,470 B2
(45) Date of Patent: Dec. 15, 2020

(54) POWER SUPPLY DEVICE FOR VEHICLE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Hisanori Kanbara, Mie (JP); Naoya Koda, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/495,497

(22) PCT Filed: Mar. 12, 2018

(86) PCT No.: PCT/JP2018/009534
§ 371 (c)(1),
(2) Date: Sep. 19, 2019

(87) PCT Pub. No.: WO2018/180425
PCT Pub. Date: Oct. 4, 2018

(65) Prior Publication Data
US 2020/0099306 A1    Mar. 26, 2020

(30) Foreign Application Priority Data
Mar. 31, 2017   (JP) ................................ 2017-070383

(51) Int. Cl.
*H02M 3/158*     (2006.01)
*B60L 53/22*     (2019.01)
(Continued)

(52) U.S. Cl.
CPC ........... *H02M 3/1588* (2013.01); *B60L 53/22* (2019.02); *H02M 1/08* (2013.01); *B60L 2210/10* (2013.01); *H02M 2001/0009* (2013.01)

(58) Field of Classification Search
CPC .......... H03K 7/08; H02M 7/48; H02M 3/158; H02M 3/157; H02M 1/08; H02M 1/06;
(Continued)

(56) References Cited

U.S. PATENT DOCUMENTS

| | | |
|---|---|---|
| 2003/0081433 A1 | 5/2003 | Itakura et al. |
| 2009/0140673 A1 | 6/2009 | Kasai et al. |

(Continued)

FOREIGN PATENT DOCUMENTS

| | | |
|---|---|---|
| JP | 2010-161915 A | 7/2010 |
| JP | 2011-078212 A | 4/2011 |

OTHER PUBLICATIONS

International Search Report, Application No. PCT/JP2018/009534, dated May 1, 2018. ISA/Japan Patent Office.

*Primary Examiner* — Rexford N Barnie
*Assistant Examiner* — Jagdeep S Dhillon
(74) *Attorney, Agent, or Firm* — Honigman LLP

(57) ABSTRACT

Provided is a vehicle power supply device that is capable of executing non-synchronous rectification control and synchronous rectification control while switching therebetween and can suppress, during switching from the non-synchronous rectification control to the synchronous rectification control, an output voltage value from significantly deviating from a target voltage value. If a determination unit determines, during the execution of the non-synchronous rectification control, that a current-increasing state arises, a driving unit performs switching to the synchronous rectification control in which a PWM signal with a duty cycle of (Continued)

a fixed value is supplied to a first switch unit, and then performs the synchronous rectification control in which a PWM signal with a duty cycle that is calculated by a feedback operation unit based on the target output voltage value and the detection result of the detecting unit is supplied to the first switch unit.

12 Claims, 6 Drawing Sheets

(51) Int. Cl.
    *H02M 1/08*     (2006.01)
    *H02M 1/00*     (2006.01)

(58) Field of Classification Search
    CPC ... H02J 7/24; H02J 7/245; H02J 7/244; H02P 9/00; H02P 9/006; B60L 53/00; B60L 53/22; B60L 53/24

USPC ........... 307/9.1, 10.1, 10.2, 66, 64; 323/281, 323/283, 285, 286

See application file for complete search history.

(56) References Cited

U.S. PATENT DOCUMENTS

| | | | |
|---|---|---|---|
| 2011/0198921 A1* | 8/2011 | Sone | H01M 8/04559 307/10.1 |
| 2016/0001660 A1* | 1/2016 | Tomura | H02J 1/00 307/10.1 |
| 2016/0129796 A1* | 5/2016 | Tomura | B60L 58/15 701/22 |
| 2016/0137069 A1* | 5/2016 | Ishigaki | B60L 50/50 307/10.1 |
| 2019/0020336 A1* | 1/2019 | Abe | H02M 3/157 |
| 2019/0173108 A1* | 6/2019 | Kitamoto | H01M 8/04126 |

* cited by examiner

POWER SUPPLY DEVICE FOR VEHICLE

CROSS-REFERENCE TO RELATED APPLICATIONS

This application is the U.S. national stage of PCT/JP2018/009534 filed on Mar. 12, 2018, which claims priority of Japanese Patent Application No. JP 2017-070383 filed on Mar. 31, 2017, the contents of which are incorporated herein.

TECHNICAL FIELD

The present disclosure relates to a vehicle power supply device.

BACKGROUND

JP 2011-78212A discloses, as a technology that relates to a DC-DC converter for increasing or decreasing a DC voltage by driving a switching element, a configuration in which switching between synchronous rectification control and non-synchronous rectification control is performed depending on the state of a load. This DC-DC converter is configured to detect an absolute value of an off period of a high-side switching element and performs switching between synchronous rectification and non-synchronous rectification based on the detected absolute value of the off period.

In the DC-DC converter disclosed in JP 2011-78212A, in order to suppress a power loss that occurs in a diode while the non-synchronous rectification control is being executed, switching to the synchronous rectification control is performed when the duty cycle of the high-side switching element increases due to heavy load conditions.

However, the duty cycle of a PWM signal supplied to the switching element differs between the non-synchronous rectification control and the synchronous rectification control even when a voltage of the same magnitude is to be output. For this reason, during the switching from the non-synchronous rectification control to the synchronous rectification control, if the switching to the synchronous rectification control is performed while still using the duty cycle that has been used during the non-synchronous rectification control, there is a risk that an output voltage immediately after the switching will significantly deviate from a target voltage.

The present disclosure was made based on the above-described circumstances, and an object thereof is to provide a vehicle power supply device that is capable of executing non-synchronous rectification control and synchronous rectification control while switching therebetween and can suppress an output voltage value from significantly deviating from a target voltage value during switching from the non-synchronous rectification control to the synchronous rectification control.

SUMMARY

A vehicle power supply device according to a first aspect of the present disclosure is a vehicle power supply device including: a voltage conversion unit configured to decrease an input voltage applied to a first conductive path and output the decreased voltage to a second conductive path; a detecting unit configured to detect at least one of an output voltage value and an output current value that are output by the voltage conversion unit to the second conductive path; and a signal generation circuit configured to generate a signal to be supplied to the voltage conversion unit. The voltage conversion unit includes: a first switch unit and a second switch unit that are connected in series between the first conductive path and a reference conductive path that is kept at a predetermined reference potential lower than a potential of the first conductive path; and an inductor that is provided between a connecting portion that connects the first switch unit and the second switch unit to each other and the second conductive path; and a diode unit that is connected, in parallel, to the second switch unit, a cathode of the diode unit being connected to the connecting portion side and an anode thereof being connected to the reference conductive path side. The signal generation circuit includes: a feedback operation unit configured to perform a feedback operation for calculating, based on a target output voltage value of the voltage conversion unit and a detection result of the detecting unit, a duty cycle of a PWM signal that is to be supplied to the first switch unit; a driving unit configured to supply, to the first switch unit, the PWM signal with the duty cycle calculated by the feedback operation unit, the driving unit being configured to execute synchronous rectification control for turning the second switch unit off and on in correspondence with turning the first switch unit on and off and non-synchronous rectification control for turning the first switch unit on and off while keeping the second switch unit turned off, while switching between the synchronous rectification control and the non-synchronous rectification control; and a determination unit configured to determine whether or not the second conductive path is in a predetermined current-increasing state or a predetermined voltage-decreasing state, wherein, if the determination unit determines, during the execution of the non-synchronous rectification control, that the second conductive path is in the predetermined current-increasing state or the predetermined voltage-decreasing state, the driving unit performs switching to the synchronous rectification control in which a PWM signal with a duty cycle of a predetermined set value is supplied to the first switch unit, and then performs the synchronous rectification control in which a PWM signal with a duty cycle that is calculated by the feedback operation unit based on the target output voltage value and the detection result of the detecting unit is supplied to the first switch unit.

A vehicle power supply device according to a second aspect of the present disclosure is a vehicle power supply device including: a voltage conversion unit configured to increase an input voltage applied to a first conductive path and output the increased voltage to a second conductive path; a detecting unit configured to detect at least one of an output voltage value and an output current value that are output by the voltage conversion unit to the second conductive path; and a signal generation circuit configured to generate a signal to be supplied to the voltage conversion unit, the voltage conversion unit having; an inductor and a first switch unit that are connected in series between the first conductive path and a reference conductive path that is kept at a predetermined reference potential lower than a potential of the first conductive path; a second switch unit that is provided between a connecting portion that connects the inductor and the first switch unit to each other and the second conductive path; and a diode unit that is connected, in parallel, to the second switch unit, an anode of the diode unit being connected to the connecting portion side and a cathode thereof being connected to the second conductive path side, the signal generation circuit having; a detecting unit configured to detect at least one of the output voltage value and the output current value that are output by the voltage conversion unit to the second conductive path; a feedback operation unit configured to perform a feedback operation for calculating, based on a target output voltage value of the voltage conversion unit and a detection result of the detecting unit, a duty cycle of a PWM signal that is to be supplied to the first switch unit; a driving unit configured to supply, to the first switch unit, the PWM signal with the duty cycle calculated by the feedback operation unit, the driving unit being configured to execute synchronous rectification control for turning the second switch unit off and on in correspondence with turning the first switch unit on and off and non-synchronous rectification control for turning the first switch unit on and off while keeping the second switch unit turned off, while switching between the synchronous rectification control and the non-synchronous rectification control; and a determination unit configured to determine whether or not the second conductive path is in a predetermined current-increasing state or a predetermined voltage-decreasing state, wherein, if the determination unit determines, during the execution of the non-synchronous rectification control, that the second conductive path is in the predetermined current-increasing state or the predetermined voltage-decreasing state, the driving unit performs switching to the synchronous rectification control in which a PWM signal with a duty cycle of a predetermined set value is supplied to the first switch unit, and then performs the synchronous rectification control in which a PWM signal with a duty cycle that is calculated by the feedback operation unit based on the target output voltage value and the detection result of the detecting unit is supplied to the first switch unit.

Advantageous Effects of Disclosure

The vehicle power supply devices according to the first and second aspects of the present disclosure have a configuration in which the driving unit performs switching between the synchronous rectification control and the non-synchronous rectification control, and therefore, it is possible to properly use the synchronous rectification control and the non-synchronous rectification control for different purposes without being fixed to either one of these control methods. In particular, if a predetermined current-increasing state or a predetermined voltage-decreasing state arises while the non-synchronous rectification control is being executed, the determination unit can detect this state, and switching to the synchronous rectification control can be performed accordingly, and thus, it is easy to suppress a loss during a time when the output current value is increasing. Furthermore, a configuration is adopted in which, when switching from the non-synchronous rectification control to the synchronous rectification control is to be performed, switching to the synchronous rectification control in which a PWM signal with a duty cycle of a predetermined set value is supplied to the first switch unit is performed, and then, the synchronous rectification control in which a PWM signal with a duty cycle that is calculated by the feedback operation unit based on the target output voltage value and the detection result of the detecting unit is supplied to the first switch unit is executed. That is to say, during the switching from the non-synchronous rectification control to the synchronous rectification control, the extent of dependency on the duty cycle that has been used during the non-synchronous rectification control is suppressed, and the duty cycle can be quickly changed to the predetermined set value. Accordingly, it is possible to suppress a deviation in output (deviation from the target output voltage value) that is caused by continued use of an inappropriate duty cycle (duty cycle that differs from the set value) immediately after the switching to the synchronous rectification control.

DETAILED DESCRIPTION OF PREFERRED EMBODIMENTS

Figure 1:
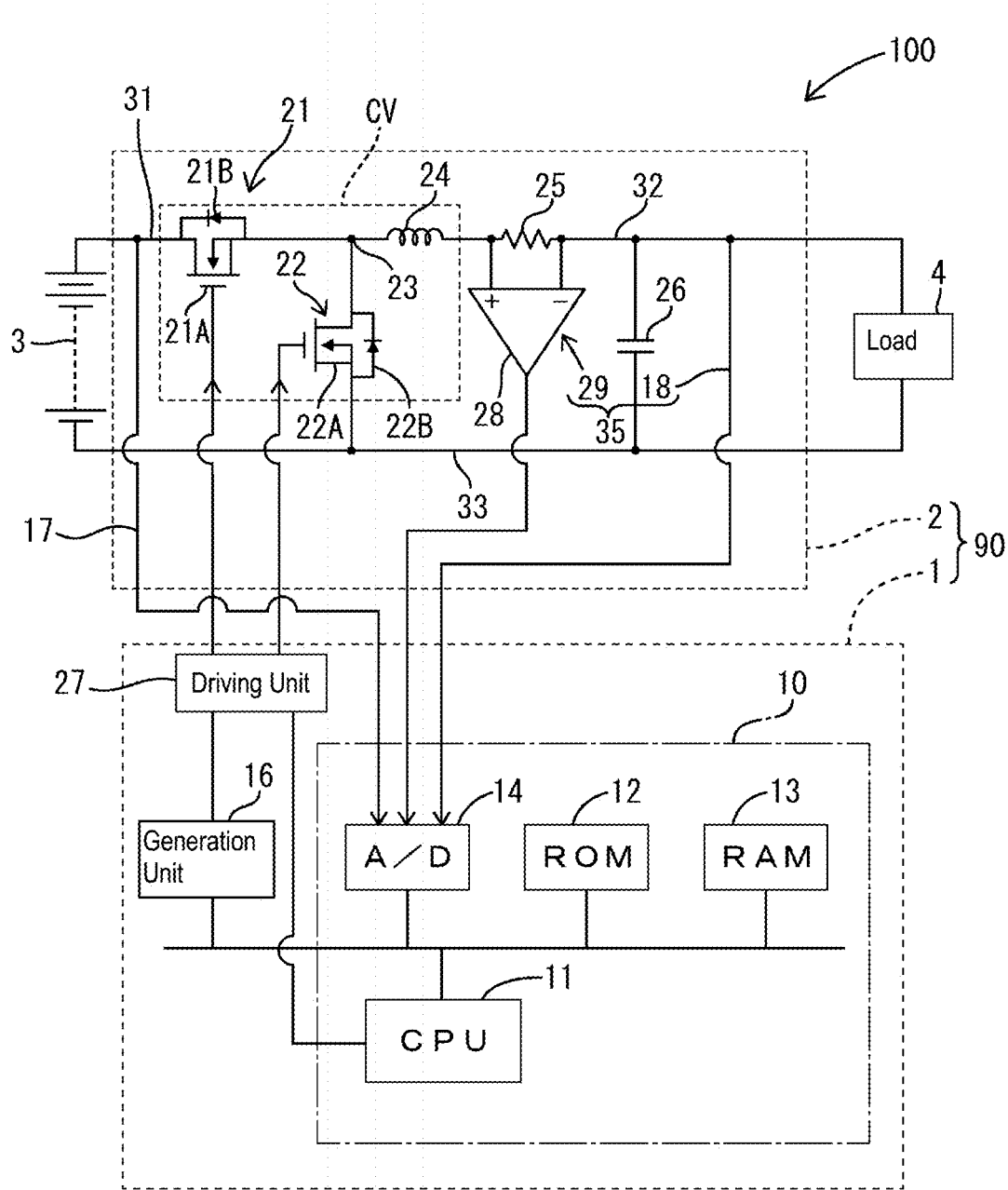
FIG. 1 is a circuit diagram schematically illustrating a vehicle power supply system including a vehicle power supply device of Embodiment 1.

Here, desired examples of the present disclosure will be given below.

In the vehicle power supply device according to the first aspect, the set value may be a value based on the target output voltage value and a voltage value of the input voltage.

With this configuration, a value associated with the target output voltage value and the voltage value of the input voltage can be set as the set value, and it is possible to set a value that reflects the relationship between the target output voltage value and the voltage value of the input voltage.

In the vehicle power supply device according to the first aspect, the set value may be a value obtained by dividing the target output voltage value by the voltage value of the input voltage.

In this manner, if the value obtained by dividing the target output voltage value by the voltage value of the input voltage, that is, a theoretical value (theoretical value of the duty cycle for outputting an output voltage of a magnitude corresponding to the target output voltage value) of a voltage-decreasing converter, is used as the set value that is used during the switching from the non-synchronous rectification control to the synchronous rectification control, it is even easier to prevent, while continuing the voltage-decreasing operation, the output voltage value from significantly deviating from the target output voltage value during the switching from the non-synchronous rectification control to the synchronous rectification control.

In the vehicle power supply device according to the second aspect, the set value may be a value based on the target output voltage value and a voltage value of the input voltage.

With this configuration, a value associated with the target output voltage value and the voltage value of the input voltage can be set as the set value, and it is possible to set a value that reflects the relationship between the target output voltage value and the voltage value of the input voltage.

In the vehicle power supply device according to the second aspect, the set value may be a value obtained by dividing the difference between the target output voltage value and the voltage value of the input voltage by the target output voltage value.

In this manner, if the value obtained by dividing the difference between the target output voltage value and the voltage value of the input voltage by the target output voltage value, that is, a theoretical value (theoretical value of the duty cycle for outputting an output voltage of a magnitude corresponding to the target output voltage value) of a voltage-increasing converter, is used as the set value that is used during the switching from the non-synchronous rectification control to the synchronous rectification control, it is even easier to prevent, while continuing the voltage-increasing operation, the output voltage value from significantly deviating from the target output voltage value during the switching from the non-synchronous rectification control to the synchronous rectification control.

The detecting unit may be configured to detect the output current value. The determination unit may function so as to determine whether or not the output current value detected by the detecting unit is equal to or greater than a predetermined threshold value. The driving unit may function such that, if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

This vehicle power supply device is capable of more quickly switching to the synchronous rectification control when current is increasing such that the output current value that is output from the voltage conversion unit becomes the predetermined threshold value or greater, and thereby makes it easier to suppress a power loss that is caused by excessive continuance of the non-synchronous rectification control when current is increasing.

Embodiment 1

Hereinafter, Embodiment 1 of the present disclosure will be described.

A vehicle power supply system 100 shown in FIG. 1 mainly includes a vehicle power supply device 90 (hereinafter also referred to simply as the power supply device 90) constituted by a signal generation circuit 1 and a voltage conversion device 2, a battery 3 serving as power supply unit, and a load 4 to which power is supplied, and is configured as a vehicle power supply system that supplies power to the load 4 for a vehicle, based on the power supplied from the battery 3.

The battery 3 is constituted by a known power storage means such as a lead-acid battery, for example, and generates a predetermined voltage. A high-potential-side terminal of the battery 3 is electrically connected to a first conductive path 31, and a low-potential-side terminal of the battery 3 is electrically connected to a reference conductive path 33 that is maintained at a predetermined reference potential (specifically, a ground potential of 0 V) that is lower than the potential of the first conductive path 31.

The load 4 corresponds to all electrical loads for use in a vehicle, such as, for example, electrical loads of a lighting system, such as a headlight; electrical loads of an accessory system, such as an audio device, a navigation device, and a wiper; and electrical loads of a driving system, such as an electric brake and an electric power steering device.

The voltage conversion device 2 is connected to the external battery 3 and the external load 4, and has the function of decreasing a DC voltage from the battery 3 and supplying the decreased DC voltage to the load 4. This voltage conversion device 2 includes a voltage-decreasing type voltage conversion unit (converter) CV for decreasing a DC voltage, a driving unit 27 for driving the voltage conversion unit CV, a condenser 26 for smoothing the voltage that has been decreased by the voltage conversion unit CV, and a detecting unit 35 for detecting an output voltage and an output current that are output by the voltage conversion unit CV to a second conductive path 32.

The voltage conversion unit CV is a so-called single-phase converter and is provided between the first conductive path 31 and the second conductive path 32. This voltage conversion unit CV includes MOSFETs 21 and 22 as well as an inductor 24.

The MOSFET 21 is a high-side switching element that functions as an N-channel MOSFET, and includes a first switch unit 21A and a diode unit 21B. The diode unit 21B is a body diode that is formed between the source and the drain of the MOSFET 21. The first switch unit 21A is a portion of the MOSFET 21 other than the body diode.

The MOSFET 22 is a low-side switching element that functions as an N-channel MOSFET, and includes a second switch unit 22A and a diode unit 22B. The diode unit 22B is a body diode that is formed between the source and the drain of the MOSFET 22. The second switch unit 22A is a portion of the MOSFET 22 other than the body diode.

In the voltage conversion unit CV, the first switch unit 21A and the second switch unit 22A are connected in series between the first conductive path 31 and reference conductive path 33, and the inductor 24 is provided between a connecting portion 23 (conductive portion that connects the first switch unit 21A and the second switch unit 22A to each other) and the second conductive path 32. Moreover, the second switch unit 22A and the diode unit 22B are connected in parallel, and a cathode of the diode unit 22B is connected to the connecting portion 23 side and an anode thereof is connected to the reference conductive path 33 side. The thus configured voltage conversion unit CV functions so as to decrease an input voltage applied to the first conductive path 31 by switching the first switch unit 21A on and off and output the decreased voltage to the second conductive path 32.

The first conductive path 31, which serves as an input-side conductive path, is connected to the drain of the high-side first switch unit 21A, and the drain of the low-side second switch unit 22A and an end of the inductor 24 are connected to the source of the first switch unit 21A. A driving signal (ON signal) and a non-driving signal (OFF signal) from the driving unit 27 are to be input to the gate of the first switch unit 21A, and the first switch unit 21A is configured to be switched between an ON state and an OFF state depending on the signal from the driving unit 27. Similarly, a driving signal (ON signal) and a non-driving signal (OFF signal) from the driving unit 27 are to be input to the gate of the second switch unit 22A, and the second switch unit 22A is configured to be switched between an ON state and an OFF state depending on the signal from the driving unit 27.

The detecting unit 35 includes a current detection circuit 29 and a conductive path 18. The current detection circuit 29 functions so as to detect an output current value that is output by the voltage conversion unit CV to the second conductive path 32. Specifically, the current detection circuit 29 functions so as to generate a value (analog voltage value from which the output current value can be specified) that reflects the output current value from the voltage conversion unit CV. The current detection circuit 29 has a resistor 25 and a differential amplifier 28. A decrease in voltage that has been produced in the resistor 25 by an output current from the voltage conversion unit CV is amplified by the differential amplifier 28 into a detection voltage (analog voltage signal) corresponding to the output current, and this detection voltage is input to the signal generation circuit 1. The conductive path 18 is a signal path to which an analog voltage signal is applied, and functions so as to generate a value (specifically, a voltage value at a position to which the conductive path 18 is connected, of the second conductive path 32) that reflects an output voltage value from the voltage conversion unit CV and input the generated value to the signal generation circuit 1.

The conductive path 17 is a signal path to which an analog voltage signal is applied, and functions so as to generate a value that reflects a voltage value (voltage value that is to be input to the voltage conversion unit CV) that is applied to the first conductive path 31, and input the generated value to the signal generation circuit 1. A voltage at a position to which the conductive path 17 is connected, of the first conductive path 31 is applied to the conductive path 17, and the voltage value at this connected position is input to the signal generation circuit 1.

The signal generation circuit 1 is configured to output a PWM signal to the voltage conversion device 2, and is configured as a circuit capable of calculating and setting, based on a target output voltage value that is set beforehand, the duty cycle of the PWM signal that is to be output to the voltage conversion device 2, by using a predetermined calculation method. Moreover, the signal generation circuit 1 functions so as to perform a feedback operation for calculating, based on the target output voltage value and the detection result of the detecting unit 35, the duty cycle of a PWM signal that is to be applied to the first switch unit 21A. Furthermore, the signal generation circuit 1 functions so as to execute synchronous rectification control and non-synchronous rectification control while switching therebetween.

The control circuit 10 includes a microcomputer that has a CPU 11. The CPU 11 is connected through a bus to a ROM 12 for storing information such as a program, a RAM 13 for storing temporarily generated information, an A/D converter 14 for converting an analog voltage to a digital value, and the like. Furthermore, a generation unit 16 is connected to the CPU 11 through the bus. The detection voltage (analog voltage corresponding to the output current) from the current detection circuit 29 and the detection voltage (analog voltage corresponding to the output voltage) from the conductive path 18 are supplied to the A/D converter 14. The detection voltages that are input via the current detection circuit 29 and the conductive path 18, respectively, are converted to digital values in the A/D converter 14.

The example in FIG. 1 shows a configuration in which the conductive path 17 functions as a voltage detection circuit, and the voltage of the input-side first conductive path 31 is input to the A/D converter 14 via the conductive path 17. However, the voltage detection circuit may also be configured such that the voltage of the first conductive path 31 is divided and input to the A/D converter 14. Also, the example in FIG. 1 shows a configuration in which the conductive path 18 functions as a voltage detection circuit, and the voltage of the output-side second conductive path 32 is input to the A/D converter 14 via the conductive path 18, but the voltage detection circuit may also be configured such that the voltage of the second conductive path 32 is divided and input to the A/D converter 14.

Next, functions that are executed in the signal generation circuit 1 will be described in detail.

Figure 2:
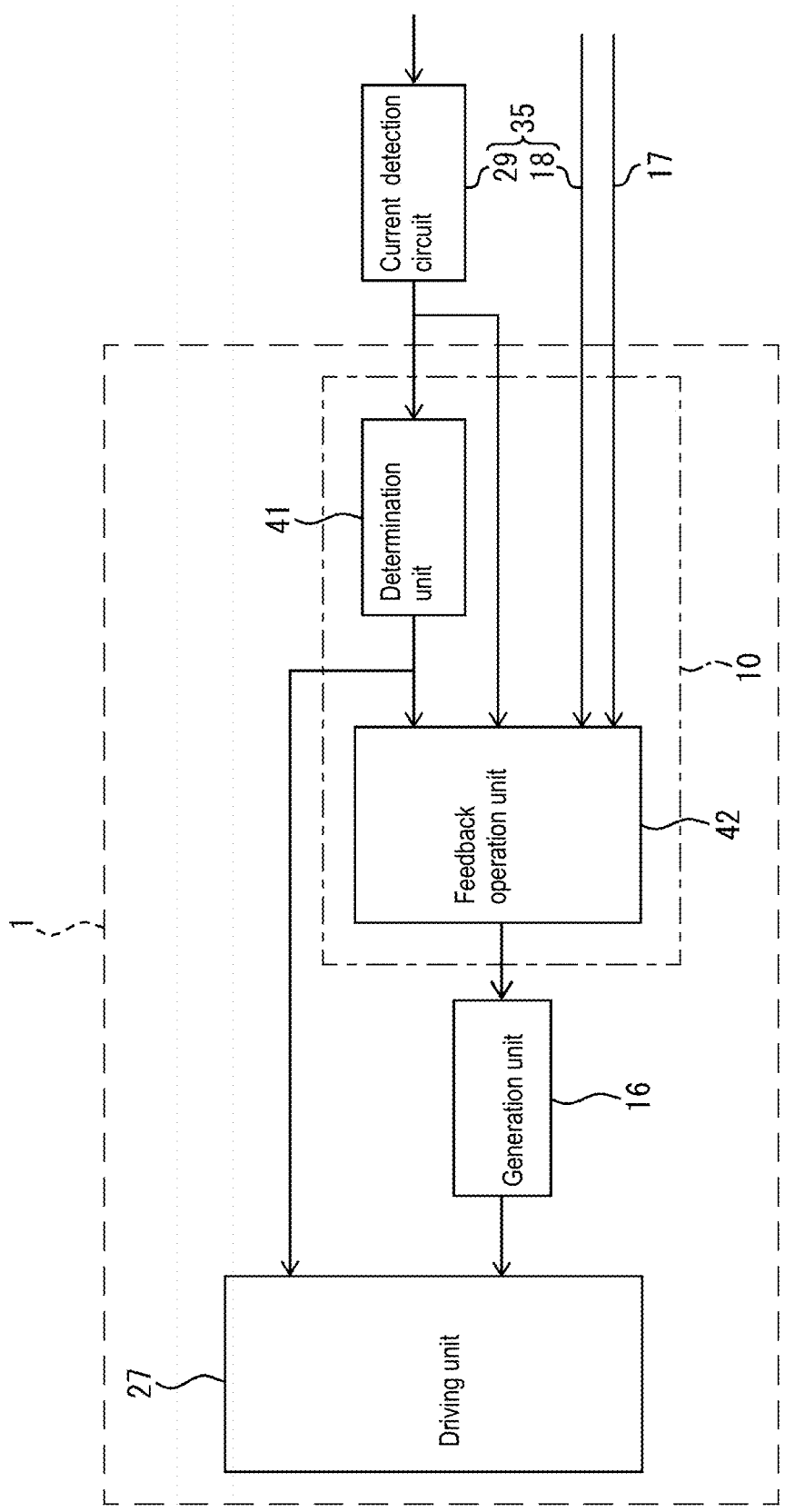
FIG. 2 is a block diagram schematically illustrating functions executed by a control circuit shown in FIG. 1 and peripheral constituent elements thereof.

FIG. 2 is a functional block diagram illustrating the relationship of the functions executed in the signal generation circuit 1. Note that the functions executed in the signal generation circuit 1 may be realized through software processing with use of an information processing unit, or may be realized by a hardware circuit. Moreover, the functions may be realized by separate devices, or a plurality of functions may be realized by a shared device.

A determination unit 41 shown in FIG. 2 determines, based on the detection result detected by the detecting unit 35, whether or not the second conductive path 32 is in a predetermined current-increasing state. The determination unit 41 functions such that, if a current value (value of an output current) specified by a signal that is input from the current detection circuit 29 is equal to or greater than a predetermined threshold value I1, the determination unit 41 determines that "the second conductive path 32 is in the predetermined current-increasing state", and if not, the determination unit 41 determines that "the second conductive path 32 is not in the predetermined current-increasing state". Specifically, if a voltage value that is input from the current detection circuit 29 is equal to or greater than a predetermined voltage threshold value (voltage threshold value corresponding to the threshold value I1), the determination unit 41 determines that "the second conductive path 32 is in the predetermined current-increasing state", and notifies the feedback operation unit 42 and the driving unit 27 to this effect. Conversely, if a voltage value that is input from the current detection circuit 29 is less than the predetermined voltage threshold value, the determination unit 41 determines that "the second conductive path 32 is not in the predetermined current-increasing state", and notifies the feedback operation unit 42 and the driving unit 27 to this effect.

The feedback operation unit 42 functions so as to execute a feedback operation for calculating, based on the target output voltage value and the detection result of the detecting unit 35, the duty cycle of a PWM signal that is to be supplied to the first switch unit 21A. Specifically, the feedback operation unit 42 calculates, based on the deviation of the voltage value of an output voltage detected by the detecting unit 35 from the target output voltage value, manipulated variables (i.e., ON operation times of the first switch unit 21A and the second switch unit 22A) in accordance with a preset gain, and calculates a duty cycle that reflects the manipulated variables. A known method can be used to perform the feedback operation for calculating a duty cycle based on the deviation of the voltage value of the output voltage from the target output voltage value. The feedback operation unit 42 repeatedly updates the duty cycle by executing this feedback operation.

The feedback operation unit 42 operates so as to update the duty cycle by executing the feedback operation, except for a predetermined period, and supply a new duty cycle to the generation unit 16 each time the duty cycle is updated. On the other hand, during the predetermined period (period immediately after the determination unit 41 determines that the second conductive path 32 is in the current-increasing state, while the driving unit 27 is executing the non-synchronous rectification control), the feedback operation unit 42 operates so as to use, as the duty cycle, a set value that is calculated using a predetermined operation method, and supply this duty cycle to the generation unit 16.

The generation unit 16 is configured as a known PWM signal generation circuit, and generates a PWM signal with a duty cycle that is set by the feedback operation unit 42. The generation unit 16 includes, for example, an internal clock, which is not shown, and generates a PWM signal with an ON time that is an integral multiple of the cycle of the internal clock. The PWM signal generated by the generation unit 16 is supplied to the driving unit 27.

The driving unit 27 is configured to output the PWM signal supplied from the generation unit 16 (PWM signal with a duty cycle calculated by the feedback operation unit 42, which will be described later) to the first switch unit 21A, and furthermore, functions so as to perform the synchronous rectification control (control for turning the second switch unit 22A off and on in correspondence with turning the first switch unit 21A on and off) and the non-synchronous rectification control (control for turning the first switch unit 21A on and off while keeping the second switch unit 22A turned off) while switching therebetween. A switching signal for switching the voltage conversion unit CV between the synchronous rectification control and the non-synchronous rectification control is supplied from the control circuit 10 to the driving unit 27. Based on this switching signal, the driving unit 27 applies ON signals to the first switch unit 21A and the second switch unit 22A. Specifically, based on a PWM signal that is supplied from the generation unit 16 when the synchronous rectification control is instructed by the control circuit 10, the driving unit 27 applies ON signals for alternatingly turning on the first switch unit 21A and the second switch unit 22A on respective control cycles to the gates of the first switch unit 21A and the second switch unit 22A. On the other hand, when the non-synchronous rectification control is instructed by the control circuit 10, the driving unit 27 does not apply an ON signal to the second switch unit 22A, and applies an ON signal for turning on the first switch unit 21A on the relevant control cycle to the gate of the first switch unit 21A while maintaining the OFF state of the second switch unit 22A.

The thus configured power supply device 90 functions as a voltage-decreasing type converter that is capable of switching between the synchronous rectification control and the non-synchronous rectification control. When the synchronous rectification control is selected, the low-side second switch unit 22A is switched on and off in synchronism with the operation of the high-side first switch unit 21A, and, as a result of this switching operation, the DC voltage applied to the first conductive path 31 is decreased and output to the second conductive path 32. On the other hand, when the non-synchronous rectification control is selected, while the OFF state of the low-side second switch unit 22A is maintained, the high-side first switch unit 21A is switched on and off, and, as a result of this switching operation, a DC voltage applied to the first conductive path 31 is decreased and output to the second conductive path 32.

Next, the manner in which the functions of the signal generation circuit 1 are realized will be described with reference to a flow chart shown in FIG. 3 and a timing chart shown in FIG. 4.

Figure 3:
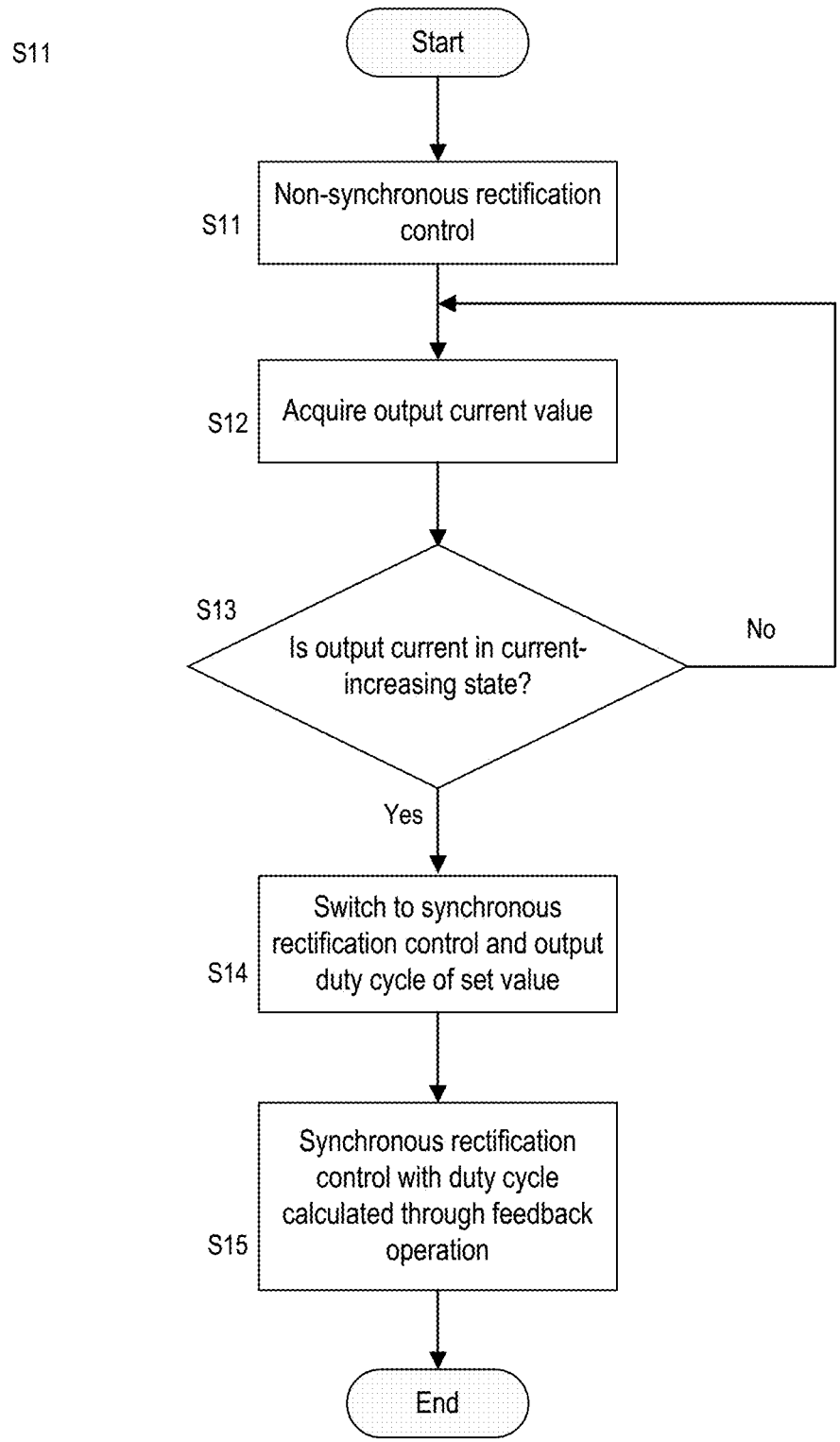
FIG. 3 is a flow chart showing the flow of control executed in the control circuit shown in FIG. 1.

The signal generation circuit 1 starts control such as that shown in FIG. 3 when a predetermined first condition is fulfilled, and first executes non-synchronous rectification control at step S11. There is no particular limitation on "when the predetermined first condition is fulfilled", but it is desirable that this is when execution of the non-synchronous rectification control should be started, and, for example, it is possible to consider that the first condition is fulfilled when an ignition switch is turned from an OFF state to an ON state, or when the output current continues to be less than a certain value for a certain period of time or longer. Alternatively, the first condition may be fulfilled at a time other than these times.

In the signal generation circuit 1, if the non-synchronous rectification control is started at step S11, the driving unit 27 performs the above-described non-synchronous rectification control (control for turning the first switch unit 21A on and off while keeping the second switch unit 22A turned off), and performs a voltage-decreasing operation so as to output a voltage of a predetermined target output voltage value (V1) to the second conductive path 32. While this non-synchronous rectification control is continuing, the feedback operation unit 42 performs the above-described feedback operation and repeatedly updates the duty cycle. The generation unit 16 generates a PWM signal with a duty cycle that is supplied from the feedback operation unit 42, and the driving unit 27 turns the first switch unit 21A on and off based on the PWM signal generated by the generation unit 16 while keeping the second switch unit 22A turned off. If such non-synchronous rectification control is selected when, for example, the output current is low, the current consumption can be suppressed.

After the non-synchronous rectification control is started at step S11, the signal generation circuit 1, at step S12, checks the output current detected by the current detection circuit 29, and at step S13, determines whether or not the output current is in the "current-increasing state". Specifically, with use of the function of the above-described determination unit 41, the signal generation circuit 1 determines whether or not a voltage value that is input from the current detection circuit 29 is equal to or greater than the predetermined voltage threshold value (whether or not the current value of the output current is equal to or greater than the predetermined threshold value I1), and if the voltage value that is input from the current detection circuit 29 is less than the predetermined voltage threshold value, the signal generation circuit 1 returns the procedure to step S12 and continues the non-synchronous rectification control. On the other hand, if it is determined, at step S13, that the voltage value that is input from the current detection circuit 29 is equal to or greater than the predetermined voltage threshold value, the procedure is advanced to step S14, and switching from the non-synchronous rectification control to the synchronous rectification control is performed. The function of the determination unit 41 of performing the processing of step S13 may be executed by, for example, the CPU 11, or by a hardware circuit or the like other than the CPU 11.

Figure 4:
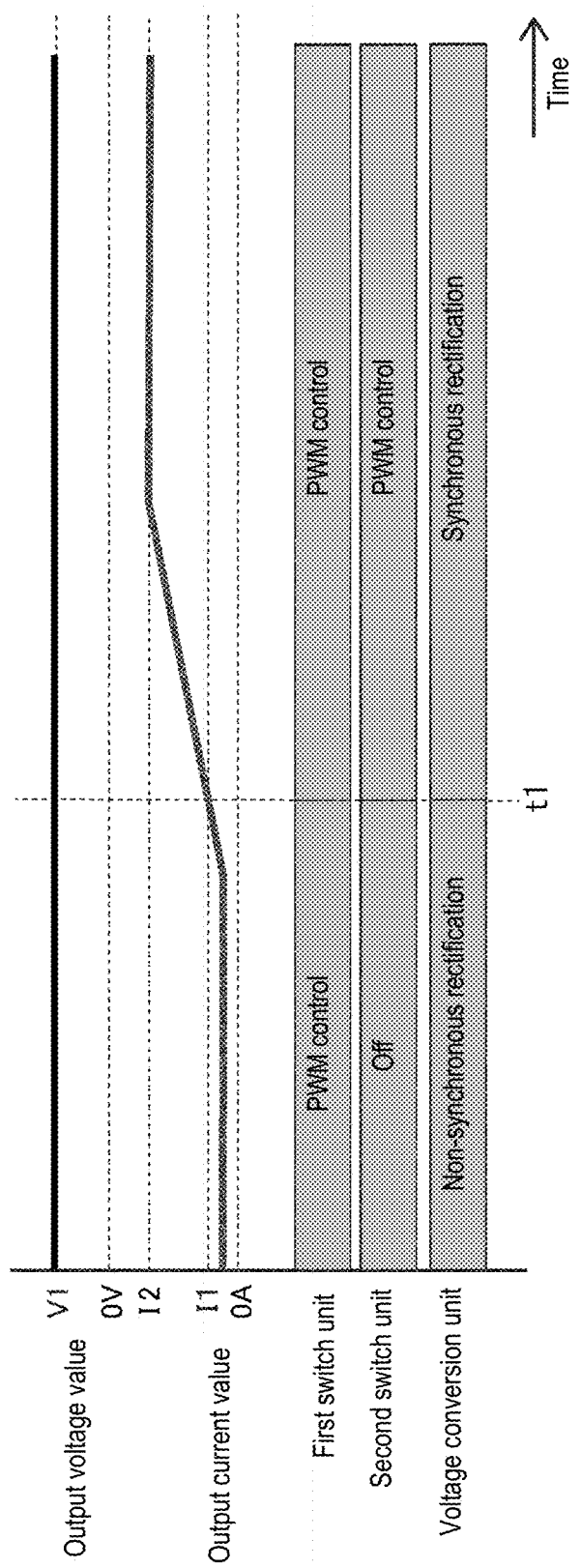
FIG. 4 is a timing chart illustrating changes in an output voltage value, an output current value, a first switch unit, a second switch unit, and a voltage conversion unit (converter) of the vehicle power supply device shown in FIG. 1.

For example, as shown in FIG. 4, while the voltage conversion unit CV (converter) is executing the non-synchronous rectification control, if the load 4 is driven (e.g., a headlight is driven, etc.) and thus the output current value increases to the threshold value I1 or greater, the processing of step S14 is executed, and switching to the synchronous rectification control is performed, immediately after the output current value becomes the threshold value I1 or greater.

Then, if the switching from the non-synchronous rectification control to the synchronous rectification control is to be performed at step S14, the signal generation circuit 1 executes the synchronous rectification control in which a PWM signal with a duty cycle of a predetermined set value is supplied to the first switch unit 21A. Specifically, immediately after the determination unit 41 determines at step S13 that the voltage value that is input from the current detection circuit 29 is equal to or greater than the predetermined voltage threshold value, the feedback operation unit 42 switches the duty cycle to the predetermined set value. Then, the generation unit 16 generates a PWM signal with a duty cycle of the set value, and the driving unit 27 executes the synchronous rectification control with the duty cycle of the set value. For example, a value Vt/Vin obtained by dividing the target output voltage value Vt by the voltage value Vin (voltage value that is detected via the conductive path 17) of the input voltage at the time of step S14 can be used as the set value. Immediately after the determination unit 41 determines at step S13 that the voltage value that is input from the current detection circuit 29 is equal to or greater than the predetermined voltage threshold value, the feedback operation unit 42 uses the set value Vt/Vin as the duty cycle instead of performing the feedback operation once, or a predetermined plurality of times. Accordingly, immediately after the determination unit 41 determines at step S13 that the voltage value that is input from the current detection circuit 29 is equal to or greater than the predetermined voltage threshold value, a PWM signal with a duty cycle of the set value Vt/Vin is output from the generation unit 16 for the number of times the feedback operation is skipped (once, or the predetermined plurality of times). On the other hand, since the driving unit 27 performs switching from the non-synchronous rectification control to the synchronous rectification control immediately after the determination unit 41 determines at step S13 that the voltage value that is input from the current detection circuit 29 is equal to or greater than the predetermined voltage threshold value, the synchronous rectification control in which the PWM signal with the duty cycle of the set value Vt/Vin is output is executed during a period for which the feedback operation is skipped once, or the predetermined plurality of times, from the point in time at which the driving unit 27 has started the synchronous rectification control.

Generally, the duty cycle of the PWM signal that is supplied to a switching element differs between the non-synchronous rectification control and the synchronous rectification control, even when a voltage of the same magnitude is to be output. For example, with a configuration in which the degree of duty cycle in the case where the target output voltage value Vt is output while the non-synchronous rectification control is being executed is lower than the degree of duty cycle in the case where the target output voltage value Vt is output while the synchronous rectification control is being executed, if the duty cycle that has been used during the non-synchronous rectification control is still used after the switching to the synchronous rectification control, there is a risk that the output voltage will significantly decrease immediately after the switching to the synchronous rectification control. In contrast, with the above-described method, since a theoretical value (set value Vt/Vin) based on the input voltage value Vin at the time of switching and the target output voltage value Vt is used immediately after the switching, the deviation of the duty cycle is likely to be suppressed, and thus, it is easy to prevent the above-described decrease in voltage.

In the signal generation circuit 1, after step S14, the processing of step S15 is executed. Specifically, at step S14, the feedback operation unit 42 uses the set value Vt/Vin as the duty cycle instead of performing the feedback operation once, or a predetermined plurality of times, and thereafter, at step S15, the feedback operation unit 42 performs the usual feedback operation (i.e., feedback operation for calculating a duty cycle with use of a known method based on the deviation of the voltage value Vout of the output voltage that is detected via the conductive path 18 from the target output voltage value Vt). Accordingly, at this time, the duty cycle that is obtained through the usual feedback operation is supplied to the generation unit 16.

Since the control is performed in the above-described manner, the driving unit 27 operates such that, at step S14, the driving unit 27 performs switching to the synchronous rectification control in which a PWM signal with a duty cycle of the set value Vt/Vin is supplied to the first switch unit 21A, and executes this control for a predetermined number of cycles (a single cycle or a plurality of cycles) after the switching, and then, at step S15, the driving unit 27 executes the synchronous rectification control in which a PWM signal with a duty cycle that is calculated by the feedback operation unit 42 based on the target output voltage value Vt and the detection result of the detecting unit 35 is supplied to the first switch unit 21A.

Next, the effects of the above-described configuration will be described.

Since the vehicle power supply device 90 is configured such that the driving unit 27 performs switching between the synchronous rectification control and the non-synchronous rectification control, it is possible to properly use the synchronous rectification control and the non-synchronous rectification control for different purposes without being fixed to either one of these control methods. In particular, if the predetermined current-increasing state arises while the non-synchronous rectification control is being executed, the determination unit 41 can detect this state, and switching to the synchronous rectification control can be performed accordingly. Thus, it is easy to suppress a loss during a time when the output current value is increasing. Furthermore, when switching from the non-synchronous rectification control to the synchronous rectification control is to be performed, switching to first synchronous rectification control (synchronous rectification control in which a PWM signal with a duty cycle of a predetermined set value is supplied to the first switch unit 21A) is performed first, and then, second synchronous rectification control (synchronous rectification control in which a PWM signal with a duty cycle that is calculated by the feedback operation unit 42 based on the target output voltage value and the detection result of the detecting unit 35 is supplied to the first switch unit 21A) is executed. That is to say, during the switching from the non-synchronous rectification control to the synchronous rectification control, the extent of dependency on the duty cycle that has been used during the non-synchronous rectification control is suppressed, and the duty cycle can be quickly changed to the predetermined set value. Accordingly, it is possible to suppress a deviation in output (deviation from the target output voltage value) that is caused by continued use of an inappropriate duty cycle (duty cycle that differs from the set value) immediately after the switching to the synchronous rectification control.

Moreover, a decrease in output voltage at the time of switching between the control methods can be suppressed with use of a simple configuration in which a predetermined function (a function of setting a duty cycle of a predetermined set value) is imparted to the control circuit 10, without the need to add a new circuit component or the like.

Furthermore, in the vehicle power supply device 90, the value Vt/Vin obtained by dividing the target output voltage value Vt by the voltage value Vin of the input voltage is used as the set value. In this manner, if the value Vt/Vin obtained by dividing the target output voltage value by the voltage value of the input voltage, that is, the theoretical value (theoretical value of the duty cycle for outputting an output voltage of a magnitude corresponding to the target output voltage value) of a voltage-decreasing converter, is used as the set value during the switching from the non-synchronous rectification control to the synchronous rectification control, it is even easier to prevent, while continuing the voltage-decreasing operation, an output voltage value from significantly deviating from the target output voltage value Vt during the switching from the non-synchronous rectification control to the synchronous rectification control.

The detecting unit 35 is configured to detect the current value of an output current that flows through the second conductive path 32. The determination unit 41 functions so as to determine whether or not the current value of the output current detected by the detecting unit 35 is equal to or greater than the predetermined threshold value I1. The driving unit 27 functions such that, if the determination unit 41 determines, during the execution of the non-synchronous rectification control, that the current value of the output current is equal to or greater than the predetermined threshold value I1, the driving unit 27 performs switching to the first synchronous rectification control (synchronous rectification control in which a PWM signal with a duty cycle of the set value is supplied to the first switch unit 21A), and then executes the second synchronous rectification control (synchronous rectification control in which a PWM signal with a duty cycle that is calculated by the feedback operation unit 42 based on the target output voltage value Vt and the detection result of the detecting unit 35 is supplied to the first switch unit 21A). This vehicle power supply device 90 is capable of more quickly switching to the synchronous rectification control when current is increasing such that the current value of the output current that is output from the voltage conversion unit CV becomes the predetermined threshold value I1 or greater, and thereby makes it easier to suppress a power loss that is caused by excessive continuance of the non-synchronous rectification control when current is increasing.

In particular, in the non-synchronous rectification control, the output voltage value is less responsive to an increase in the input current value, compared with that in the synchronous rectification control, and there is a risk that, if the output current value is rapidly increasing, the increase in the output voltage value will not be able to follow that rapid increase, resulting in a decrease in the output voltage value. However, in the above-described example, since switching from the non-synchronous rectification control to the synchronous rectification control can be performed at a predetermined timing (time t1 in FIG. 4) at which the output current value is increasing, the responsiveness of the output voltage value to an increase in the input current value can be increased, and thus a decrease in the output voltage value can be more effectively suppressed.

Moreover, in a converter in which switching between non-synchronous rectification control and synchronous rectification control is performed, there is a risk that, if the synchronous rectification control is executed when the output current is at a low level, backflow of the output current will occur. However, as in the above-described example, if the non-synchronous rectification control is executed during a time when the output current value is relatively low, and the synchronous rectification control is executed during a time when the output current value is relatively high, such backflow is easily prevented.

Embodiment 2

Next, Embodiment 2 will be described.

Figure 5:
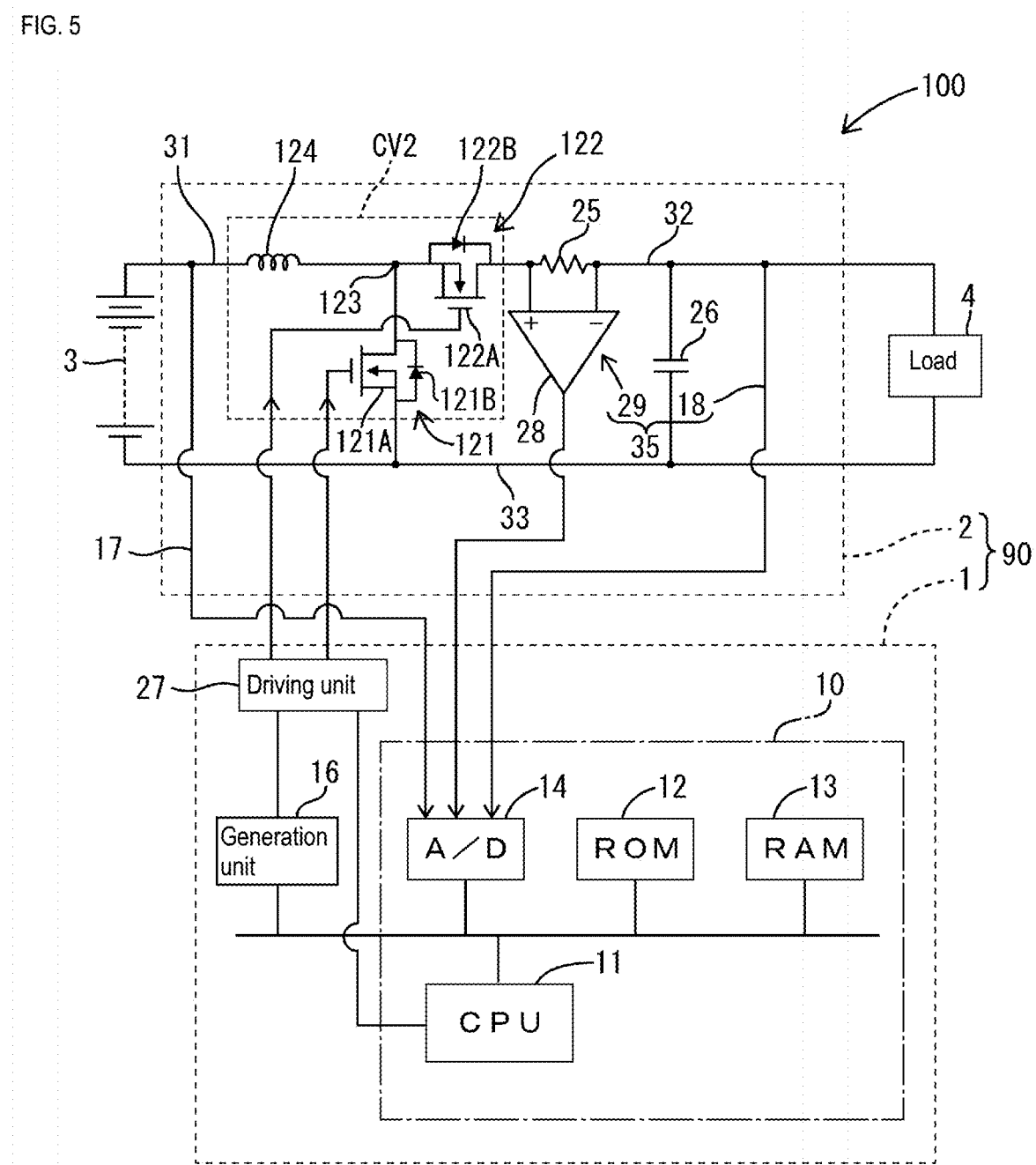
FIG. 5 is a circuit diagram schematically illustrating a vehicle power supply system including a vehicle power supply device of Embodiment 2.

The vehicle power supply device 90 of Embodiment 2 differs from that of Embodiment 1 in that the voltage conversion device 2 includes a voltage-increasing type voltage conversion unit CV2 instead of the voltage-decreasing type voltage conversion unit CV. Furthermore, the method for calculating the set value is different from that of the vehicle power supply device 90 of Embodiment 1. The configuration and processing other than these are the same as those of Embodiment 1. Accordingly, in the following description, portions constituting the same configuration as those of Embodiment 1 are denoted by the same reference numerals as those of Embodiment 1 and will not be described in detail, and the differences from Embodiment 1 will be mainly described. Note that the power supply system 100 shown in FIG. 5 is the same as the power supply system 100 shown in FIG. 1, except for the vehicle power supply device 90.

The voltage conversion unit CV2 is a so-called single-phase converter and is provided between the first conductive path 31 and the second conductive path 32. This voltage conversion unit CV2 includes MOSFETs 121 and 122 as well as an inductor 124.

The MOSFET 121 is a switching element that functions as an N-channel MOSFET, and includes a first switch unit 121A and a diode unit 121B. The diode unit 121B is a body diode formed between the source and the drain of the MOSFET 121. The first switch unit 121A is a portion of the MOSFET 121 other than the body diode.

The MOSFET 122 is a switching element that functions as an N-channel MOSFET, and includes a second switch unit 122A and a diode unit 122B. The diode unit 122B is a body diode formed between the source and the drain of the MOSFET 122. The second switch unit 122A is a portion of the MOSFET 122 other than the body diode.

In the voltage conversion unit CV2, the inductor 124 and the first switch unit 121A are connected in series between the first conductive path 31 and the reference conductive path 33, and the second switch unit 122A is provided between a connecting portion 123 (conductive portion that connects the inductor 124 and the first switch unit 121A to each other) and the second conductive path 32. Also, the second switch unit 122A and the diode unit 122B are connected in parallel, and a cathode of the diode unit 122B is connected to the second conductive path 32 side and an anode thereof is connected to the connecting portion 123 side. The thus configured voltage conversion unit CV2 functions so as to increase an input voltage applied to the first conductive path 31 by switching the first switch unit 121A on and off, and output the increased voltage to the second conductive path 32.

A driving signal (ON signal) and a non-driving signal (OFF signal) from the driving unit 27 are to be input to the gate of the first switch unit 121A, and the first switch unit 121A is configured to be switched between an ON state and an OFF state depending on the signal from the driving unit 27. Similarly, a driving signal (ON signal) and a non-driving signal (OFF signal) from the driving unit 27 are to be input to the gate of the second switch unit 122A, and the second switch unit 122A is configured to be switched between an ON state and an OFF state depending on the signal from the driving unit 27.

The thus configured power supply device 90 functions as a voltage-increasing type converter capable of switching between synchronous rectification control and non-synchronous rectification control. When the synchronous rectification control is selected, the second switch unit 122A is switched on and off in synchronism with the operation of the first switch unit 121A. As a result of this switching operation, a DC voltage applied to the first conductive path 31 is increased, and the increased voltage is output to the second conductive path 32. On the other hand, when the non-synchronous rectification control is selected, the first switch unit 121A is switched on and off while the OFF state of the second switch unit 122A is maintained. As a result of this switching operation, a DC voltage applied to the first conductive path 31 is increased, and the increased voltage is output to the second conductive path 32.

Next, the manner in which the functions of the signal generation circuit 1 are realized will be described with reference to a flow chart shown in FIG. 6.

Figure 6:
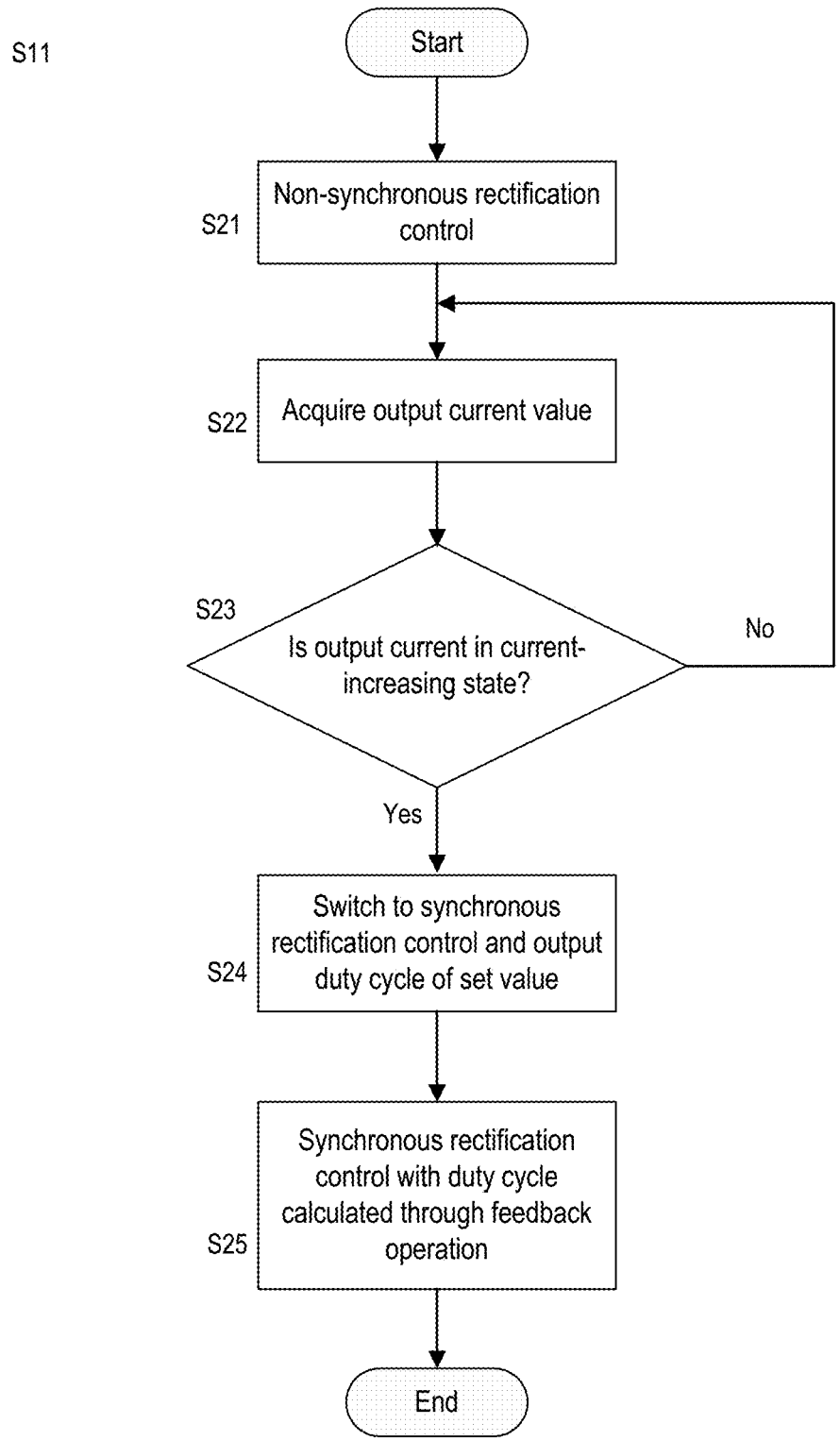
FIG. 6 is a flow chart showing the flow of control executed in a control circuit shown in FIG. 5.

The signal generation circuit 1 starts control such as that shown in FIG. 6 when a predetermined first condition is fulfilled, and first executes non-synchronous rectification control at step S21. There is no particular limitation on "when the first condition is fulfilled", but it is desirable that this is when execution of the non-synchronous rectification control should be started, and, for example, it is possible to consider that the first condition is fulfilled when an ignition switch is turned from an OFF state to an ON state, or when the output current continues to be less than a certain value for a certain period of time or longer. Alternatively, the first condition may be fulfilled at a time other than these times.

In the signal generation circuit 1, if the non-synchronous rectification control is started at step S21, the driving unit 27 performs the above-described non-synchronous rectification control (control for turning the first switch unit 121A on and off while keeping the second switch unit 122A turned off), and performs a voltage-increasing operation so as to output a voltage of a predetermined target output voltage value (V1) to the second conductive path 32. While this non-synchronous rectification control is continuing, the feedback operation unit 42 performs a feedback operation similar to that of Embodiment 1 and repeatedly updates the duty cycle. The generation unit 16 generates a PWM signal with a duty cycle that is supplied from the feedback operation unit 42, and the driving unit 27 turns the first switch unit 121A on and off based on the PWM signal generated by the generation unit 16 while keeping the second switch unit 122A turned off. If such non-synchronous rectification control is selected when, for example, the output current is low, the current consumption can be suppressed.

After the non-synchronous rectification control is started at step S21, the signal generation circuit 1, at step S22, checks the output current detected by the current detection circuit 29, and at step S23, determines whether or not the output current is in the "current-increasing state". Specifically, with use of the function of the determination unit 41 similar to that of Embodiment 1, the signal generation circuit 1 determines whether or not a voltage value that is input from the current detection circuit 29 is equal to or greater than the predetermined voltage threshold value (whether or not the current value of the output current is equal to or greater than the predetermined threshold value I1), and if the voltage value that is input from the current detection circuit 29 is less than the predetermined voltage threshold value, the signal generation circuit 1 returns the procedure to step S22 and continues the non-synchronous rectification control. On the other hand, if it is determined, at step S23, that the voltage value that is input from the current detection circuit 29 is equal to or greater than the predetermined voltage threshold value, the procedure is advanced to step S24, and switching from the non-synchronous rectification control to the synchronous rectification control is performed. The function of the determination unit 41 of performing the processing of step S23 may be executed by, for example, the CPU 11, or by a hardware circuit or the like other than the CPU 11.

Then, if switching from the non-synchronous rectification control to the synchronous rectification control is to be performed at step S24, the signal generation circuit 1 executes the synchronous rectification control in which a PWM signal with a duty cycle of a predetermined set value is supplied to the first switch unit 121A. Specifically, immediately after the determination unit 41 determines at step S23 that the voltage value that is input from the current detection circuit 29 is equal to or greater than the predetermined voltage threshold value, the feedback operation unit 42 switches the duty cycle to the predetermined set value. Then, the generation unit 16 generates a PWM signal with a duty cycle of the set value, and the driving unit 27 executes the synchronous rectification control with the duty cycle of the set value. For example, a value ((Vt−Vin)/Vt) obtained by dividing the difference between the target output voltage value Vt and the voltage value Vin of the input voltage by the target output voltage value Vt can be used as the set value. Immediately after the determination unit 41 determines at step S23 that the voltage value that is input from the current detection circuit 29 is equal to or greater than the predetermined voltage threshold value, the feedback operation unit 42 uses the set value ((Vt−Vin)/Vt) as the duty cycle instead of performing the feedback operation once, or a predetermined plurality of times. Accordingly, immediately after the determination unit 41 determines at step S23 that the voltage value that is input from the current detection circuit 29 is equal to or greater than the predetermined voltage threshold value, a PWM signal with the duty cycle of the set value ((Vt−Vin)/Vt) is output from the generation unit 16 for the number of times the feedback operation is skipped (once, or the predetermined plurality of times). On the other hand, since the driving unit 27 performs switching from the non-synchronous rectification control to the synchronous rectification control immediately after the determination unit 41 determines at step S23 that the voltage value that is input from the current detection circuit 29 is equal to or greater than the predetermined voltage threshold value, the synchronous rectification control in which a PWM signal with the duty cycle of the set value ((Vt−Vin)/Vt) is output is executed during a period for which the feedback operation is skipped once, or the predetermined plurality of times, from the point in time at which the driving unit 27 has started the synchronous rectification control.

In the signal generation circuit 1, after step S24, the processing of step S25 is executed. Specifically, at step S24, the feedback operation unit 42 uses the set value ((Vt−Vin)/Vt) as the duty cycle instead of performing the feedback operation once, or a predetermined plurality times, and thereafter, at step S25, the feedback operation unit 42 performs the usual feedback operation (i.e., feedback operation for calculating a duty cycle with use of a known method based on the deviation of the voltage value Vout of the output voltage that is detected via the conductive path 18 from the target output voltage value Vt). Accordingly, at this time, the duty cycle that is obtained through the usual feedback operation is supplied to the generation unit 16.

The vehicle power supply device 90 of Embodiment 2 that is configured as described above also achieves similar effects to those of Embodiment 1.

In the vehicle power supply device 90, the value ((Vt−Vin)/Vt) obtained by dividing the difference between the target output voltage value Vt and the input voltage value Vin by the target output voltage value Vt is used as the set value. In this manner, if the value ((Vt−Vin)/Vt) obtained by dividing the difference between the target output voltage value and the voltage value of the input voltage by the target output voltage value, that is, the theoretical value (theoretical value of the duty cycle for outputting an output voltage of a magnitude corresponding to the target output voltage value Vt) of a voltage-increasing converter, is used as the set value that is used during the switching from the non-synchronous rectification control to the synchronous rectification control, it is even easier to prevent, while continuing the voltage-increasing operation, an output voltage value from significantly deviating from the target output voltage value Vt during the switching from the non-synchronous rectification control to the synchronous rectification control.

Other Embodiments

The present disclosure is not limited to the foregoing embodiments that have been described with reference to the drawings, and, for example, the following embodiments are also embraced within the technical scope of the present disclosure. Moreover, the foregoing embodiments and the following embodiments can be combined unless they are inconsistent with one another.

In Embodiment 1, a configuration has been illustrated in which a value obtained by dividing the target output voltage value Vt by the voltage value Vin of the input voltage is used as the set value that is used by the control circuit 10 during the switching from the synchronous rectification control to the non-synchronous rectification control. However, as long as the target output voltage value Vt and the input voltage value Vin are used, the set value may also be calculated using other mathematical formulae (e.g., a mathematical formula in which the above-described theoretical value is corrected, etc.). For example, a duty cycle of a fixed value including predetermined elements α and β, like a formula (Vt+α)/(Vin+ß), may be calculated. Similarly, in Embodiment 2 as well, as long as the target output voltage value Vt and the input voltage value Vin are used, the duty cycle of the set value may also be calculated using other mathematical formulae, and, for example, a duty cycle of a fixed value including predetermined elements α and β, like a formula (Vt−Vin+α)/(Vt−Vin+ß), may be calculated.

In Embodiments 1 and 2, a configuration (see S14 in FIG. 3 and S24 in FIG. 6) has been described in which switching from the non-synchronous rectification control to the synchronous rectification control is performed when the output current of the voltage conversion unit CV (voltage conversion unit CV2 in Embodiment 2) enters a current-increasing state. However, instead of the configuration in which switching from the non-synchronous rectification control to the synchronous rectification control is performed based on the state of the output current, a configuration may also be adopted in which switching from the non-synchronous rectification control to the synchronous rectification control is performed when the output voltage from the voltage conversion unit CV2 enters a predetermined voltage-decreasing state. In this case, the determination unit 41 shown in FIG. 2 can determine whether or not the voltage value detected by the detecting unit 35 is in the predetermined voltage-decreasing state. Specifically, at step S13 or S23 that have been described above, the determination unit 41 compares the voltage value of the conductive path 18 that is input to the A/D converter 14 with a predetermined value V1, and if the voltage value of the conductive path 18 is equal to or less than the predetermined value V1 (i.e., if the voltage value of an output voltage that is output from the voltage conversion unit CV2 to the second conductive path 32 is equal to or less than a predetermined threshold value), the output voltage can be determined to be in the predetermined voltage-decreasing state, and the processing of step S14 or S24 can be performed.

At step S13 or S23, the determination unit 41 may also determine that the "predetermined voltage-decreasing state" arises when the magnitude of the duty cycle calculated by the control circuit 10 becomes equal to or greater than a predetermined threshold value. Alternatively, at step S13 or S23, the determination unit 41 may determine that the "predetermined current-increasing state" arises when a rate of increase (e.g., the amount of increase in a predetermined period of time) in the output current value that is output from the voltage conversion unit CV (the voltage conversion unit CV2 in Embodiment 2) becomes equal to or greater than a predetermined threshold value, or may determine that the "predetermined voltage-decreasing state" arises when a rate of decrease (e.g., the amount of decrease in a predetermined period of time) in the output voltage value from the voltage conversion unit CV (voltage conversion unit CV2 in Embodiment 2) becomes equal to or greater than a predetermined threshold value.

In Embodiment 1, a configuration (see S11 and S15 in FIG. 3 as well as S21 and S25 in FIG. 6) has been illustrated in which the signal generation circuit 1 performs the feedback operation for calculating the duty cycle of a PWM signal based on the target output voltage value Vt and the output voltage value Vout detected by the detecting unit 35. However, the signal generation circuit 1 may also be configured to perform a known feedback operation for calculating the duty cycle of a PWM signal based on a preset target output current value and the output current value detected by the detecting unit 35, or may be configured to perform a feedback operation, based a target output voltage value and a target output current value that are set beforehand and the output current value and the output voltage value that are detected by the detecting unit 35, with use of a known method so that the output current value or the output voltage value becomes closer to the target output voltage value or the target output current value.

The invention claimed is:

1. A vehicle power supply device comprising:
 a voltage conversion unit configured to decrease an input voltage applied to a first conductive path and output the decreased voltage to a second conductive path;
 a detecting unit configured to detect at least one of an output voltage value and an output current value that are output by the voltage conversion unit to the second conductive path; and
 a signal generation circuit configured to generate a signal to be supplied to the voltage conversion unit,
   the voltage conversion unit having:
     a first switch unit and a second switch unit that are connected in series between the first conductive path and a reference conductive path that is kept at a predetermined reference potential lower than a potential of the first conductive path; and
     an inductor that is provided between a connecting portion that connects the first switch unit and the second switch unit to each other and the second conductive path; and a diode unit that is connected, in parallel, to the second switch unit, a cathode of the diode unit being connected to the connecting portion side and an anode thereof being connected to the reference conductive path side, the signal generation circuit having:
a feedback operation unit configured to perform a feedback operation for calculating, based on a target output voltage value of the voltage conversion unit and a detection result of the detecting unit, a duty cycle of a PWM signal that is to be supplied to the first switch unit;
a driving unit configured to supply, to the first switch unit, the PWM signal with the duty cycle calculated by the feedback operation unit, the driving unit being configured to execute synchronous rectification control for turning the second switch unit off and on in correspondence with turning the first switch unit on and off and non-synchronous rectification control for turning the first switch unit on and off while keeping the second switch unit turned off, while switching between the synchronous rectification control and the non-synchronous rectification control; and
a determination unit configured to determine whether or not the second conductive path is in a predetermined current-increasing state or a predetermined voltage-decreasing state, wherein, if the determination unit determines, during the execution of the non-synchronous rectification control, that the second conductive path is in the predetermined current-increasing state or the predetermined voltage-decreasing state, the driving unit performs switching to the synchronous rectification control in which a PWM signal with a duty cycle of a predetermined set value is supplied to the first switch unit, and then performs the synchronous rectification control in which a PWM signal with a duty cycle that is calculated by the feedback operation unit based on the target output voltage value and the detection result of the detecting unit is supplied to the first switch unit.

2. The vehicle power supply device according to claim 1, wherein the set value is a value based on the target output voltage value and a voltage value of the input voltage.

3. The vehicle power supply device according to claim 2, wherein the set value is a value obtained by dividing the target output voltage value by the voltage value of the input voltage.

4. A vehicle power supply device comprising:
a voltage conversion unit configured to increase an input voltage applied to a first conductive path and output the increased voltage to a second conductive path;
a detecting unit configured to detect at least one of an output voltage value and an output current value that are output by the voltage conversion unit to the second conductive path; and
a signal generation circuit configured to generate a signal to be supplied to the voltage conversion unit,
the voltage conversion unit having:
an inductor and a first switch unit that are connected in series between the first conductive path and a reference conductive path that is kept at a predetermined reference potential lower than a potential of the first conductive path; a second switch unit that is provided between a connecting portion that connects the inductor and the first switch unit to each other and the second conductive path; and a diode unit that is connected, in parallel, to the second switch unit, an anode of the diode unit being connected to the connecting portion side and a cathode thereof being connected to the second conductive path side, the signal generation circuit having:
a detecting unit configured to detect at least one of the output voltage value and the output current value that are output by the voltage conversion unit to the second conductive path;
a feedback operation unit configured to perform a feedback operation for calculating, based on a target output voltage value of the voltage conversion unit and a detection result of the detecting unit, a duty cycle of a PWM signal that is to be supplied to the first switch unit;
a driving unit configured to supply, to the first switch unit, the PWM signal with the duty cycle calculated by the feedback operation unit, the driving unit being configured to execute synchronous rectification control for turning the second switch unit off and on in correspondence with turning the first switch unit on and off and non-synchronous rectification control for turning the first switch unit on and off while keeping the second switch unit turned off, while switching between the synchronous rectification control and the non-synchronous rectification control; and
a determination unit configured to determine whether or not the second conductive path is in a predetermined current-increasing state or a predetermined voltage-decreasing state, wherein, if the determination unit determines, during the execution of the non-synchronous rectification control, that the second conductive path is in the predetermined current-increasing state or the predetermined voltage-decreasing state, the driving unit performs switching to the synchronous rectification control in which a PWM signal with a duty cycle of a predetermined set value is supplied to the first switch unit, and then performs the synchronous rectification control in which a PWM signal with a duty cycle that is calculated by the feedback operation unit based on the target output voltage value and the detection result of the detecting unit is supplied to the first switch unit.

5. The vehicle power supply device according to claim 4, wherein the set value is a value based on the target output voltage value and a voltage value of the input voltage.

6. The vehicle power supply device according to claim 5, wherein the set value is a value obtained by dividing the difference between the target output voltage value and the voltage value of the input voltage by the target output voltage value.

7. The vehicle power supply device according to claim 1, wherein the detecting unit is configured to detect the output current value,
the determination unit is configured to determine whether or not the output current value detected by the detecting unit is equal to or greater than a predetermined threshold value, and
if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

8. The vehicle power supply device according to claim 2, wherein the detecting unit is configured to detect the output current value, the determination unit is configured to determine whether or not the output current value detected by the detecting unit is equal to or greater than a predetermined threshold value, and if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

9. The vehicle power supply device according to claim 3, wherein the detecting unit is configured to detect the output current value, the determination unit is configured to determine whether or not the output current value detected by the detecting unit is equal to or greater than a predetermined threshold value, and if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

10. The vehicle power supply device according to claim 4, wherein the detecting unit is configured to detect the output current value, the determination unit is configured to determine whether or not the output current value detected by the detecting unit is equal to or greater than a predetermined threshold value, and if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

11. The vehicle power supply device according to claim 5, wherein the detecting unit is configured to detect the output current value, the determination unit is configured to determine whether or not the output current value detected by the detecting unit is equal to or greater than a predetermined threshold value, and if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

12. The vehicle power supply device according to claim 6, wherein the detecting unit is configured to detect the output current value, the determination unit is configured to determine whether or not the output current value detected by the detecting unit is equal to or greater than a predetermined threshold value, and if the determination unit determines, during the execution of the non-synchronous rectification control, that the output current value is equal to or greater than the predetermined threshold value, the driving unit performs switching to the synchronous rectification control in which a PWM signal with a duty cycle of the set value is supplied to the first switch unit, and then executes the synchronous rectification control in which a PWM signal with a duty cycle that is calculated by the feedback operation unit based on the target output voltage value and the detection result of the detecting unit is supplied to the first switch unit.

* * * * *